United States Patent
Suzuki et al.

[11] Patent Number: 5,883,734
[45] Date of Patent: Mar. 16, 1999

[54] OPTICAL SWITCH WITH REDUCED POLARIZATION DEPENDENCY AND NO WAVEFORM DEFORMATION AND FREQUENCY SHIFT

[75] Inventors: Masatoshi Suzuki, Kawajimamachi; Shigeyuki Akiba, Tokyo, both of Japan

[73] Assignee: Kokusai Denshin Denwa Kabushiki-Kaisha, Tokyo, Japan

[21] Appl. No.: 827,638

[22] Filed: Apr. 10, 1997

[30] Foreign Application Priority Data

Apr. 11, 1996 [JP] Japan ................................. 8-089618

[51] Int. Cl.⁶ ........................................... G02F 1/29
[52] U.S. Cl. .................... 359/320; 359/305; 359/285; 372/703; 372/32
[58] Field of Search ................... 359/320, 305, 359/256, 257, 281, 484, 495, 496, 285; 372/703, 32

[56] References Cited

U.S. PATENT DOCUMENTS

| | | | |
|---|---|---|---|
| 4,736,382 | 4/1988 | O'Meara | 372/32 |
| 4,784,473 | 11/1988 | Gookin | 359/320 |
| 5,107,368 | 4/1992 | Noguchi | 359/305 |
| 5,191,339 | 3/1993 | Riza | 359/285 |
| 5,281,907 | 1/1994 | Hartup et al. | 359/305 |

*Primary Examiner*—Loha Ben
*Attorney, Agent, or Firm*—Banner & Witcoff Ltd

[57] ABSTRACT

An optical switch is formed by: at least one switch driving circuit for generating ultrasonic waves; at least one electric acousto-optic element forming at least one diffraction grating therein upon being applied with the ultrasonic waves generated by the switch driving circuit; at least one polarization rotator for rotating a polarization plane of a first primary diffracted light produced by the diffraction grating, by 90°; and a light path through which an input light is entered into the electric acousto-optic element at a Bragg angle of the diffraction grating in a first direction side, the first direction being defined as either identical or opposite to a propagation direction of the ultrasonic waves, so that the first primary diffracted light is produced by the diffraction grating from the input light, a polarization plane rotated light produced by the polarization rotator is entered into the electric acousto-optic element at a Bragg angle of the diffraction grating in a second direction side, the second direction being opposite to the first direction, and a second primary diffracted light produced by the diffraction grating from the polarization plane rotated light is outputted as an output light.

8 Claims, 2 Drawing Sheets

OPTICAL SWITCH WITH REDUCED POLARIZATION DEPENDENCY AND NO WAVEFORM DEFORMATION AND FREQUENCY SHIFT

BACKGROUND OF THE INVENTION

1. Field of the Invention

The present invention relates to an optical switch using an electro-acoustic effect, which is a high speed A/O switch with a large extinction ratio.

2. Description of the Background Art an optical switch using an electro-acoustic effect has been utilized for a variety of purposes such as a submarine cable switching and an optical signal processing, and is particularly useful for a light blocking at a time of optical path switching.

The optical switch is constructed by using a diffraction grating, which in turn is formed by an electric acousto-optic element made of a monocrystal $PbMoO_4$ for example, to which ultrasonic waves are applied in order to periodically change the refractive index of the acousto-optic element and thereby make the electric acousto-optic element functioning as the diffraction grating.

However, the conventional optical switch has a large insertion loss polarization dependency of about 0.5 dB for example, and a large polarization mode dispersion of about 10 ps delay for example, so that the conventional optical switch has been associated with a problem that the waveform deformation is caused for the high speed signals in random polarization states, as well as a problem that the frequency of the light is shifted as the light passes through the optical switch.

SUMMARY OF THE INVENTION

It is therefore an object of the present invention to provide an optical switch with a reduced polarization dependency which does not cause any waveform deformation and frequency shift.

According to one aspect of the present invention there is provided an optical switch, comprising: a switch driving circuit for generating ultrasonic waves; an electric acousto-optic element forming a diffraction grating therein upon being applied with the ultrasonic waves generated by the switch driving circuit; an input light path for entering an input light into the electric acousto-optic element at a Bragg angle of the diffraction grating in a first direction side, the first direction being defined as either identical or opposite to a propagation direction of the ultrasonic waves; a polarization rotator for rotating a polarization plane of a first primary diffracted light produced by the diffraction grating from the input light, by 90°; a reflection mechanism for entering a polarization plane rotated light produced by the polarization rotator into the electric acousto-optic element at a Bragg angle of the diffraction grating in a second direction side, the second direction being opposite to the first direction; and an output light path for outputting a second primary diffracted light produced by the diffraction grating from the polarization plane rotated light, as an output light.

According to another aspect of the present invention there is provided an optical switch, comprising: a first switch driving circuit for generating ultrasonic waves; a first electric acousto-optic element forming a first diffraction grating therein upon being applied with the ultrasonic waves generated by the first switch driving circuit; an input light path for entering an input light into the first electric acousto-optic element at a Bragg angle of the first diffraction grating in a first direction side, the first direction being defined as either identical or opposite to a propagation direction of the ultrasonic waves; a polarization rotator for rotating a polarization plane of a first primary diffracted light produced by the first diffraction grating from the input light, by 90°; a second switch driving circuit for generating ultrasonic waves; a second electric acousto-optic element forming a second diffraction grating therein upon being applied with the ultrasonic waves generated by the second switch driving circuit, into which a polarization plane rotated light produced by the polarization rotator is entered at a Bragg angle of the second diffraction grating in a second direction side, the second direction being opposite to the first direction; and an output light path for outputting a second primary diffracted light produced by the second diffraction grating from the polarization plane rotated light, as an output light.

According to another aspect of the present invention there is provided an optical switch, comprising: at least one switch driving circuit for generating ultrasonic waves; at least one electric acousto-optic element forming at least one diffraction grating therein upon being applied with the ultrasonic waves generated by said at least one switch driving circuit; at least one polarization rotator for rotating a polarization plane of a first primary diffracted light produced by said at least one diffraction grating, by 90°; and a light path through which an input light is entered into said at least one electric acousto-optic element at a Bragg angle of said at least one diffraction grating in a first direction side, the first direction being defined as either identical or opposite to a propagation direction of the ultrasonic waves, so that the first primary diffracted light is produced by said at least one diffraction grating from the input light, a polarization plane rotated light produced by said at least one polarization rotator is entered into said at least one electric acousto-optic element at a Bragg angle of said at least one diffraction grating in a second direction side, the second direction being opposite to the first direction, and a second primary diffracted light produced by said at least one diffraction grating from the polarization plane rotated light is outputted as an output light.

Other features and advantages of the present invention will become apparent from the following description taken in conjunction with the accompanying drawings.

DETAILED DESCRIPTION OF THE PREFERRED EMBODIMENTS

Figure 1:
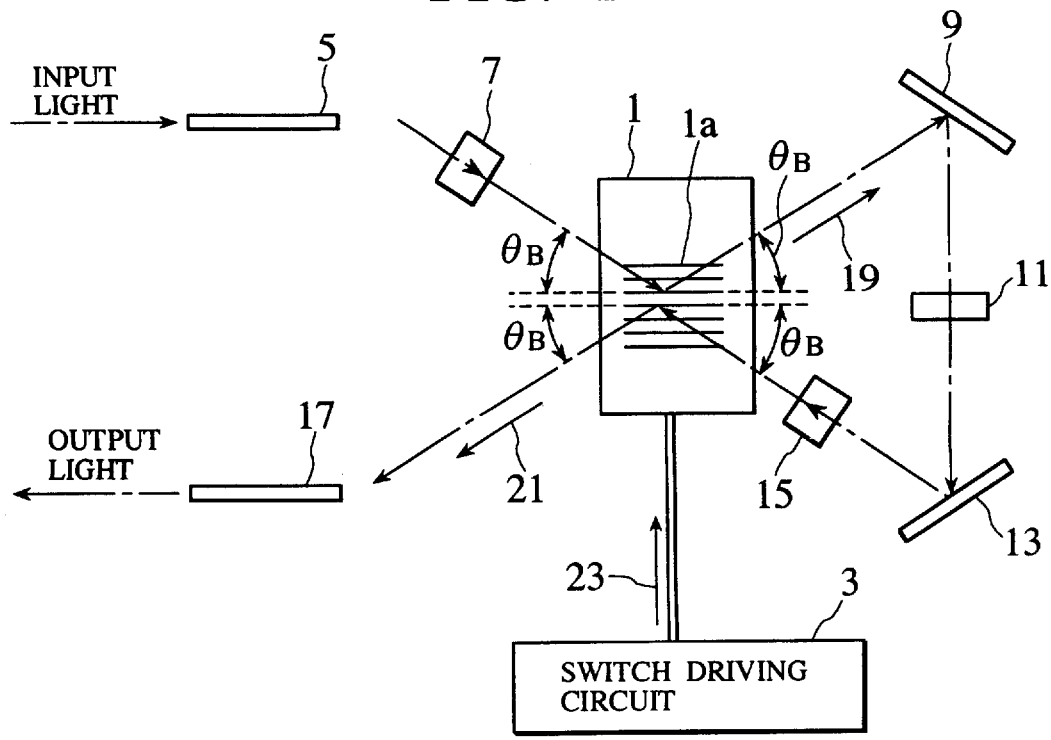
FIG. 1 is a block diagram showing a configuration of the first embodiment of an optical switch according to the present invention.

Referring now to FIG. 1, the first embodiment of an optical switch according to the present invention will be described in detail.

FIG. 1 shows a configuration of an optical switch in this first embodiment, which has an electric acousto-optic element 1 made of a monocrystal $PbMoO_4$ for example, and a switch driving circuit 3 connected to one end of the electric acousto-optic element 1. This switch driving circuit 3 constitutes an ultrasonic wave generation means for generating ultrasonic waves of a frequency f0 to be applied to and propagate through the electric acousto-optic element 1 in a direction indicated by an arrow 23. When the ultrasonic waves are applied, the electric acousto-optic element 1 changes its refractive index periodically, so as to form a diffraction grating 1a therein as indicated in FIG. 1.

In this optical switch of FIG. 1, an input light of a frequency f is entered from an optical fiber 5 through an optical isolator 7 into the electric acousto-optic element 1, at the Bragg angle $\theta_B$ of the diffraction grating 1a. Then, this input light is diffracted at the Bragg angle $\theta_B$ by the diffraction grating 1a into the same direction as a propagation direction of the ultrasonic waves from the switch driving circuit 3, and entered into a first total reflection mirror 9 as a primary diffracted light 19.

This primary diffracted light 19 is in the same direction as the propagation direction of the ultrasonic waves so that the frequency of the primary diffracted light 19 becomes f+f0 due to the Doppler effect.

Note here that by entering the input light into the diffraction grating 1a of the electric acousto-optic element 1 at the Bragg angle $\theta_B$, the primary diffracted light 19 is generated only at the same Bragg angle $\theta_B$. This Bragg angle $\theta_B$ can be expressed by the following expression:

$$\theta_B = \sin^{-1}(\lambda/2\Lambda) \approx \lambda f/2v$$

where $\lambda$ is a wavelength of the input light, $\Lambda$ is a wavelength of the ultrasonic waves, f is a frequency of the ultrasonic waves, and v is a speed of sound.

The primary diffracted light 19 of a frequency f+f0 is then totally reflected by the first total reflection mirror 9 so as to have its optical path changed, passed through a Faraday rotator 11 so as to have its polarization plane rotated by 90°.

This light with the 90° rotated polarization plane is then totally reflected by a second total reflection mirror 13, and entered into the electric acousto-optic element 1 again through an optical isolator 15, at the Bragg angle $\theta_B$ of the diffraction grating 1a, from a direction opposite to the original direction of the input light.

The light entered into the electric acousto-optic element 1 again is then diffracted at the Bragg angle $\theta_B$ by the diffraction grating 1a into the direction opposite to the propagation direction of the ultrasonic waves from the switch driving circuit 3, as a primary diffracted light 21.

This primary diffracted light 21 is in the direction opposite to the propagation direction of the ultrasonic waves so that the frequency of the primary diffracted light 21 becomes (f+f0)−f0 due to the Doppler effect, which is the same frequency as that of the input light.

This primary diffracted light 21 with the frequency set back to that of the input light is then outputted through an optical fiber 17 as the output light.

In this configuration of FIG. 1, it is possible to control the switch driving circuit 3 ON and OFF so as to form the diffraction grating 1a by applying the ultrasonic waves to the electric acousto-optic element 1 at a certain timing and not to form the diffraction grating 1a by not applying the ultrasonic waves to the electric acousto-optic element 1 at a certain other timing. In this manner, it is possible to control this optical switch of FIG. 1 so that the input light from the optical fiber 5 can be taken out as the output light from the optical fiber 17 at a certain timing and cannot be taken out as the output light at a certain other timing.

Namely, when the switch driving circuit 3 is turned ON so as to apply the ultrasonic waves to the electric acousto-optic element 1, the diffraction grating 1a is formed within the electric acousto-optic element 1 so that the input light from the optical fiber 5 can be taken out as the output light from the optical fiber 17. On the other hand, when the switch driving circuit 3 is turned OFF so as not to apply the ultrasonic waves to the electric acousto-optic element 1, the diffraction grating 1a is not formed within the electric acousto-optic element 1 so that the input light from the optical fiber 5 passes through both the optical isolator 7 and the electric acousto-optic element 1 straight and not diffracted and therefore the input light cannot be taken out as the output light.

As described above, the light which passed through the optical switch of FIG. 1 is outputted with its frequency set back to the frequency of the input light due to the twice applied Doppler effect, so that no frequency shift is caused for the light which passes through this optical switch of FIG. 1.

In addition, the light with its polarization plane rotated by 90° at the Faraday rotator 11 and entered into the electric acousto-optic element 1 from the second total reflection mirror 13 is going to pass through the electric acousto-optic element 1 in a polarization state which is perpendicular to an original polarization state of the input light, so that the polarization dependency of the insertion loss and the polarization mode dispersion are both cancelled out and become nearly equal to zero.

According to the experiment conducted by the present inventors, it was confirmed that the polarization dependency of the insertion loss is reduced from 0.5 dB in the conventional optical switch to 0.01 dB in this optical switch of FIG. 1, and the polarization mode dispersion is also reduced from 10 ps in the conventional optical switch to below 0.1 ps in this optical switch of FIG. 1. Also, in this experiment, the frequency f0 of the ultrasonic waves was set to 120 MHz, and the frequency shift in the output light was zero.

Note that, in FIG. 1, the optical isolator 15 is provided in order to prevent an entry into the second total reflection mirror 13 of a leaked part of a light which passed through the optical isolator 7 and entered into the electric acousto-optic element 1 at the Bragg angle $\theta_B$ but not completely diffracted at the diffraction grating 1a. Similarly, the optical isolator 7 is provided in order to prevent an entry into the optical fiber 5 of a leaked part of a light which passed through the optical isolator 15 from the second total reflection mirror 13 and entered into the electric acousto-optic element 1 again at the Bragg angle $\theta_B$ but not completely diffracted at the diffraction grating 1a.

Consequently, according to this first embodiment, it is possible to provide an ideal optical switch in which the polarization independence and the high extinction ratio can be realized and no waveform deformation is caused for the high speed signals in random polarization states, and it is possible to realize an optical switch for optical path switching or an optical gate suitable for a practical transmission system which has polarization fluctuations.

Figure 2:
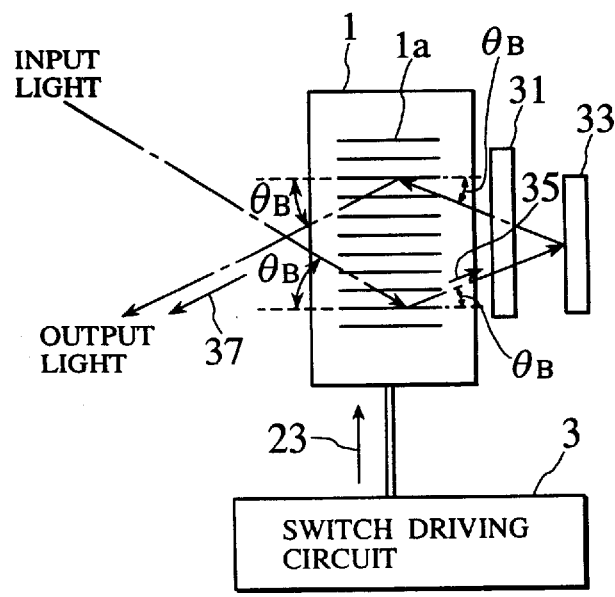
FIG. 2 is a block diagram showing a configuration of the second embodiment of an optical switch according to the present invention.

Referring now to FIG. 2, the second embodiment of an optical switch according to the present invention will be described in detail.

FIG. 2 shows a configuration of an optical switch in this second embodiment, which differs from the optical switch of FIG. 1 mainly in that a Faraday rotator 31 for rotating the polarization plane by 45° is provided at such a position through which the light passes twice so that the polarization plane is rotated by 90° in effect, instead of the Faraday rotator 11 of FIG. 1 for rotating the polarization plane by 90°, and that only one total reflection mirror 33 is provided instead of two total reflection mirrors 9 and 13 of FIG. 1. In addition, in this optical switch of FIG. 2, there is no possibility for a leaked part of a light passing through the diffraction grating 1a to be entered into the other optical path, so that the optical isolators 7 and 15 of FIG. 1 are also omitted. The rest of the configuration of FIG. 2 formed by the electric acousto-optic element 1 and the switch driving circuit 3 and their operations are substantially the same as in the optical switch of FIG. 1.

In this optical switch of FIG. 2, when an input light of a frequency f is entered into the electric acousto-optic element 1 at the Bragg angle $\theta_B$ of the diffraction grating 1a, this input light is diffracted at the Bragg angle $\theta_B$ by the diffraction grating 1a into the same direction as the propagation direction of the ultrasonic waves from the switch driving circuit 3, so as to pass through the Faraday rotator 31 as the primary diffracted light 35.

This primary diffracted light 35 is in the same direction as the propagation direction of the ultrasonic waves so that the frequency of the primary diffracted light 35 becomes f+f0 due to the Doppler effect.

The primary diffracted light 35 has its polarization plane rotated by 45° after passing through the Faraday rotator 31, and this light with the 45° rotated polarization plane is then totally reflected by the total reflection mirror 33, so as to pass through the Faraday rotator 31 again and have its polarization plane further rotated by 45° so that the polarization plane is rotated by 90° from the original polarization plane of the input light in effect.

This light with the total 90° rotated polarization plane is then entered into the electric acousto-optic element 1 again at the Bragg angle $\theta_B$ of the diffraction grating 1a, from a direction opposite to the original direction of the input light.

The light entered into the electric acousto-optic element 1 again is then diffracted at the Bragg angle $\theta_B$ by the diffraction grating 1a into the direction opposite to the propagation direction of the ultrasonic waves from the switch driving circuit 3, as a primary diffracted light 37.

This primary diffracted light 37 is in the direction opposite to the propagation direction of the ultrasonic waves so that the frequency of the primary diffracted light 37 becomes (f+f0)−f0 due to the Doppler effect, which is the same frequency as that of the input light.

This primary diffracted light 37 with the frequency set back to that of the input light is then outputted as the output light.

Similarly as in the first embodiment described above, the light which passed through the optical switch of FIG. 2 is outputted with its frequency set back to the frequency of the input light due to the twice applied Doppler effect, so that no frequency shift is caused for the light which passes through this optical switch of FIG. 2.

In addition, the light with its polarization plane rotated by 90° in total at the Faraday rotator 31 is going to pass through the electric acousto-optic element 1 in a polarization state which is perpendicular to an original polarization state of the input light, so that the polarization dependency of the insertion loss and the polarization mode dispersion are both cancelled out and become nearly equal to zero.

According to the experiment conducted by the present inventors, it was confirmed that the polarization dependency of the insertion loss is reduced from 0.5 dB in the conventional optical switch to 0.01 dB in this optical switch of FIG. 2, the polarization mode dispersion is also reduced from 10 ps in the conventional optical switch to below 0.1 ps in this optical switch of FIG. 2, and no frequency shift is caused in the output light of this optical switch of FIG. 2.

Consequently, according to this second embodiment, it is possible to provide an ideal optical switch in which the polarization independence and the high extinction ratio can be realized and no waveform deformation is caused for the high speed signals in random polarization states, and it is possible to realize an optical switch for optical path switching or an optical gate suitable for a practical transmission system which has polarization fluctuations.

In addition, the optical switch of this second embodiment has a relatively simple structure, so that it is also possible to realize this optical switch at a relatively cheap cost.

Figure 3:
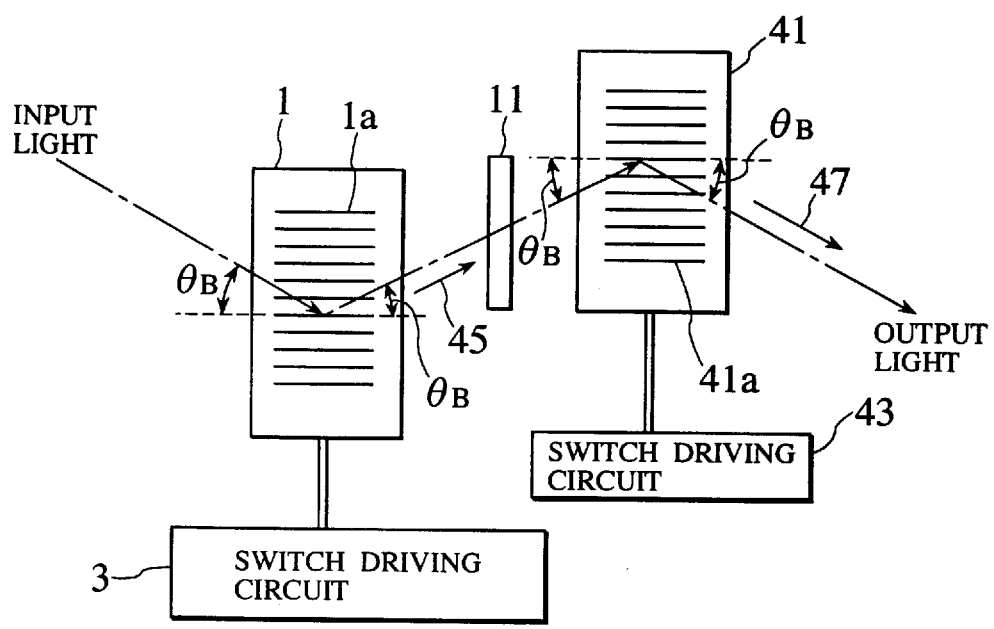
FIG. 3 is a block diagram showing a configuration of the third embodiment of an optical switch according to the present invention.

Referring now to FIG. 3, the third embodiment of an optical switch according to the present invention will be described in detail.

FIG. 3 shows a configuration of an optical switch in this third embodiment, which differs from the optical switch of FIG. 1 in that the total reflection mirrors 9 and 13 and the optical isolators 7 and 15 of FIG. 1 are omitted, while a second electric acousto-optic element 41 and a second switch driving circuit 43 connected to the second electric acousto-optic element 41 are additionally provided, and the Faraday rotator 11 is positioned on the optical path between the first and second electric acousto optic elements 1 and 41. The rest of the configuration of FIG. 3 formed by the first electric acousto-optic element 1 and the first switch driving circuit 3 and their operations are substantially the same as in the optical switch of FIG. 1.

In this optical switch of FIG. 3, when an input light of a frequency f is entered into the first electric acousto-optic element 1 at the Bragg angle $\theta_B$ of the diffraction grating 1a in the first electric acousto-optic element 1, this input light is diffracted at the Bragg angle $\theta_B$ by the diffraction grating 1a into the same direction as the propagation direction of the ultrasonic waves from the first switch driving circuit 3, so as to pass through the Faraday rotator 11 as the primary diffracted light 45.

This primary diffracted light 45 is in the same direction as the propagation direction of the ultrasonic waves so that the frequency of the primary diffracted light 45 becomes f+f0 due to the Doppler effect.

The primary diffracted light 45 has its polarization plane rotated by 90° after passing through the Faraday rotator 11, and this light with the 90° rotated polarization plane is then entered into the second electric acousto-optic element 41 at the Bragg angle $\theta_B$ of the diffraction grating 41a in the second electric acousto-optic element 41.

The light entered into the second electric acousto-optic element 41 is then diffracted at the Bragg angle $\theta_B$ by the diffraction grating 41a into the direction opposite to the propagation direction of the ultrasonic waves from the second switch driving circuit 43, as a primary diffracted light 47.

This primary diffracted light 47 is in the direction opposite to the propagation direction of the ultrasonic waves so that the frequency of the primary diffracted light 47 becomes (f+f0)−f0 due to the Doppler effect, which is the same frequency as that of the input light.

This primary diffracted light 47 with the frequency set back to that of the input light is then outputted as the output light.

Similarly as in the first and second embodiments described above, the light which passed through the optical switch of FIG. 3 is outputted with its frequency set back to the frequency of the input light due to the twice applied Doppler effect, so that no frequency shift is caused for the light which passes through this optical switch of FIG. 3.

In addition, the light with its polarization plane rotated by 90° at the Faraday rotator 11 is going to pass through the second electric acousto-optic element 41 in a polarization state which is perpendicular to an original polarization state of the input light, so that the polarization dependency of the insertion loss and the polarization mode dispersion are both cancelled out and become nearly equal to zero.

According to the experiment conducted by the present inventors, it was confirmed that the polarization dependency of the insertion loss is reduced from 0.5 dB in the conventional optical switch to 0.01 dB in this optical switch of FIG. 3, the polarization mode dispersion is also reduced from 10 ps in the conventional optical switch to below 0.1 ps in this optical switch of FIG. 3, and no frequency shift is caused in the output light of this optical switch of FIG. 3.

Consequently, according to this third embodiment, it is possible to provide an ideal optical switch in which the polarization independence and the high extinction ratio can be realized and no waveform deformation is caused for the high speed signals in random polarization states, and it is possible to realize an optical switch for optical path switching or an optical gate suitable for a practical transmission system which has polarization fluctuations.

In addition, the optical switch of this third embodiment has a relatively simple structure, so that it is also possible to realize this optical switch with a relatively high reliability.

It is to be noted that the third embodiment described above can be modified to use a single common switch driving circuit for both of the first and second electric acousto-optic elements 1 and 41.

It is also to be noted that the third embodiment described above can be modified to use different driving voltages at the first and second switch driving circuits 3 and 43, for the purpose of improved controlling such as a removal of the residual polarization dependency for example.

It is to be noted that, in the first to third embodiments described above, the light is diffracted by the diffraction grating of the electric acousto-optic element into the same direction as the propagation direction of the ultrasonic waves first, and then diffracted into a direction opposite to the propagation direction of the ultrasonic waves next, but the present invention is not limited to this order of diffracting directions. Namely, it is possible to modify the above described embodiments such that the light is diffracted into the direction opposite to the propagation direction of the ultrasonic waves first, and then diffracted into the same direction as the propagation direction of the ultrasonic waves next. In essence, according to the present invention, it suffices to diffract the light into the same direction as the propagation direction of the ultrasonic waves once and into the direction opposite to the propagation direction of the ultrasonic waves once.

It is also to be noted that the first to third embodiments described above can be modified by an obvious replacement of components, such as a use of two 45° Faraday rotators instead of one 90° Faraday rotator for example.

It is also to be noted that the optical switch according to the present invention as described above can be utilized as an optical switch for which the high extinction ratio and the polarization independence are required. For example, it is possible to form a switch for optical path switching in a known configuration by using a 3 dB coupler and two optical switches according to the present invention.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical switch, comprising:
   a switch driving circuit for generating ultrasonic waves;
   an electric acousto-optic element forming a diffraction grating therein upon being applied with the ultrasonic waves generated by the switch driving circuit;
   an input light path for entering an input light into the electric acousto-optic element at a Bragg angle of the diffraction grating in a first direction side, the first direction being defined as either identical or opposite to a propagation direction of the ultrasonic waves;
   a polarization rotator for rotating a polarization plane of a first primary diffracted light produced by the diffraction grating from the input light, by 90°;
   a reflection mechanism for entering a polarization plane rotated light produced by the polarization rotator into the electric acousto-optic element at a Bragg angle of the diffraction grating in a second direction side, the second direction being opposite to the first direction; and
   an output light path for outputting a second primary diffracted light produced by the diffraction grating from the polarization plane rotated light, as an output light.

2. The optical switch of claim 1, wherein the polarization rotator is a Faraday rotator for rotating the polarization plane of a light passing therein by 90°, and the first primary diffracted light is directed to pass through the Faraday rotator once.

3. The optical switch of claim 2, wherein the reflection mechanism includes:
   a first mirror for totally reflecting the first primary diffracted light toward the Faraday rotator, so that the first primary diffracted light passes through the Faraday rotator once; and
   a second mirror for totally reflecting the polarization plane rotated light toward the electric acousto-optic element, so that the polarization plane rotated light is entered into the electric acousto-optic element at a Bragg angle of the diffraction grating in the second direction.

4. The optical switch of claim 1, wherein the polarization rotator is a Faraday rotator for rotating the polarization plane of a light passing therein by 45°, and the first primary diffracted light is directed to pass through the Faraday rotator twice.

5. The optical switch of claim 4, wherein the Faraday rotator is located between the electric acousto-optic element and the reflection mechanism and the first primary diffracted light produced by the diffraction grating from the input light is directed to the Faraday rotator, and the reflection mechanism includes:
   a mirror for totally reflecting the first primary diffracted light which passed through the Faraday rotator once toward the Faraday rotator, so that the first primary diffracted light passes through the Faraday rotator twice and the polarization plane rotated light produced by passing through the Faraday rotator twice is entered into the electric acousto-optic element at a Bragg angle of the diffraction grating in the second direction.

6. An optical switch, comprising:
   a first switch driving circuit for generating ultrasonic waves;
   a first electric acousto-optic element forming a first diffraction grating therein upon being applied with the ultrasonic waves generated by the first switch driving circuit;

an input light path for entering an input light into the first electric acousto-optic element at a Bragg angle of the first diffraction grating in a first direction side, the first direction being defined as either identical or opposite to a propagation direction of the ultrasonic waves;

a polarization rotator for rotating a polarization plane of a first primary diffracted light produced by the first diffraction grating from the input light, by 90°;

a second switch driving circuit for generating ultrasonic waves;

a second electric acousto-optic element forming a second diffraction grating therein upon being applied with the ultrasonic waves generated by the second switch driving circuit, into which a polarization plane rotated light produced by the polarization rotator is entered at a Bragg angle of the second diffraction grating in a second direction side, the second direction being opposite to the first direction; and an output light path for outputting a second primary diffracted light produced by the second diffraction grating from the polarization plane rotated light, as an output light.

7. The optical switch of claim 6, wherein the polarization rotator is a Faraday rotator for rotating the polarization plane of a light passing through the Faraday rotator by 90°, which is located between the first electric acousto-optic element and the second electric acousto-optic element.

8. An optical switch, comprising:

at least one switch driving circuit for generating ultrasonic waves;

at least one electric acousto-optic element forming at least one diffraction grating therein upon being applied with the ultrasonic waves generated by said at least one switch driving circuit;

at least one polarization rotator for rotating a polarization plane of a first primary diffracted light produced by said at least one diffraction grating, by 90°; and a light path through which an input light is entered into said at least one electric acousto-optic element at a Bragg angle of said at least one diffraction grating in a first direction side, the first direction being defined as either identical or opposite to a propagation direction of the ultrasonic waves, so that the first primary diffracted light is produced by said at least one diffraction grating from the input light, a polarization plane rotated light produced by said at least one polarization rotator is entered into said at least one electric acousto-optic element at a Bragg angle of said at least one diffraction grating in a second direction side, the second direction being opposite to the first direction, and a second primary diffracted light produced by said at least one diffraction grating from the polarization plane rotated light is outputted as an output light.

* * * * *